June 15, 1937.  W. A. KULL ET AL  2,083,718
STEERING LEVER JOINT
Filed Sept. 8, 1934
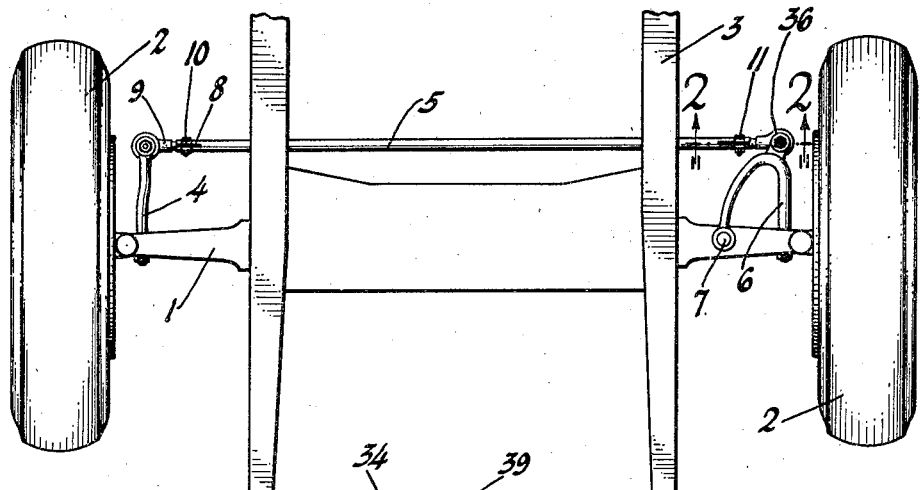
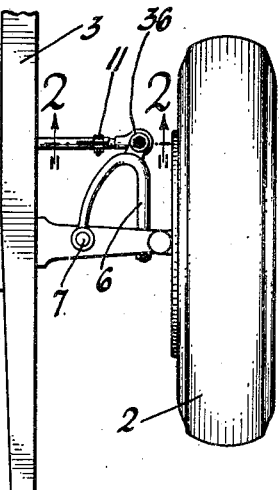
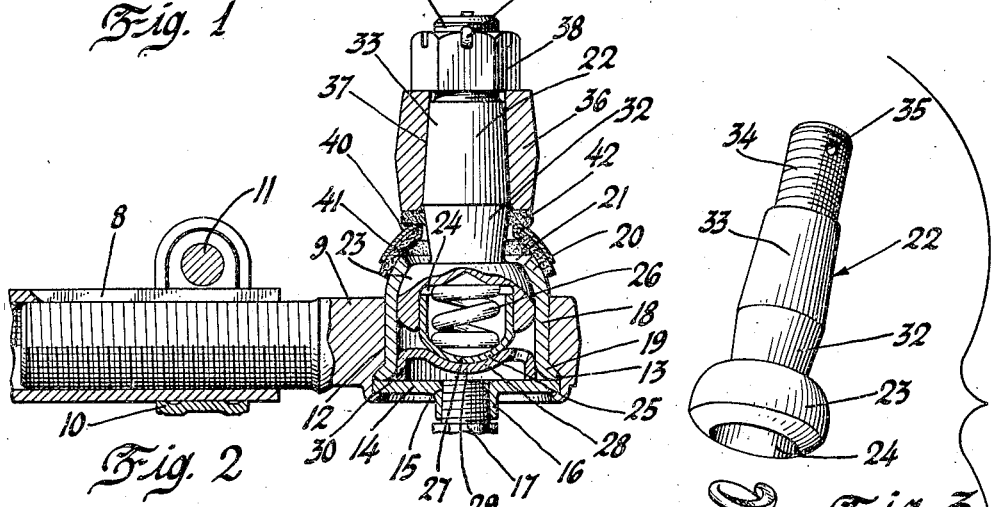
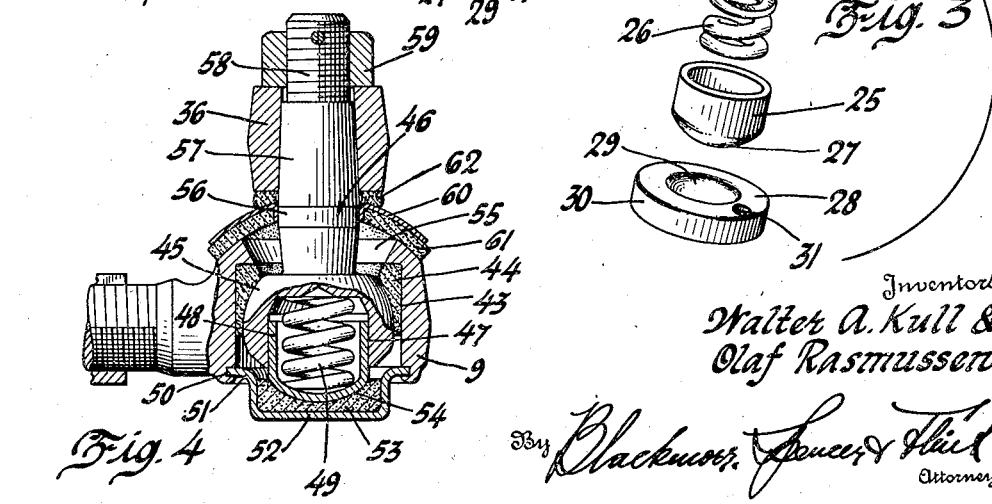
Inventors
Walter A. Kull &
Olaf Rasmussen
By Blackmore, Spencer & Hull
Attorneys Patented June 15, 1937

2,083,718

UNITED STATES PATENT OFFICE 2,083,718

STEERING LEVER JOINT

Walter A. Kull, Saginaw, and Olaf Rasmussen, Detroit, Mich., assignors to General Motors Corporation, Saginaw, Mich., a corporation of Delaware Application September 8, 1934, Serial No. 743,206

6 Claims. (Cl. 287—90)

This invention relates to self-adjusting joint structure to compensate for wear of parts and more specifically to a self-adjusting joint between a tie rod and steering arm in the steering mechanism of a motor car.

The tie rod joints of a car are subjected to considerable wear and vibration during the life of the car as they support the whole weight of the tie rod. When the usual bearings and pins become worn, not only is it more difficult to steer the car satisfactorily, but also the tie rod begins to rattle and is very annoying. Therefore, both from the standpoint of safety and comfort it is desirable to keep these joints sufficiently tight at all times.

The object of this invention is therefore to provide a self-adjusting tie rod joint which is comparatively simple and practical.

For a better understanding of the nature and objects of our invention, reference is made to the following specification, wherein there are described the embodiments of our invention which are illustrated in the accompanying drawing, in which:

Figure 1 is a partial top plan view of an automobile chassis.

Figure 2 is an enlarged sectional view on line 2—2 of Figure 1.

Figure 3 is a detail perspective view showing the parts of the joint in spaced relation.

Figure 4 is a sectional view similar to Figure 2 of a modified form of our invention.

The front axle 1 carries the wheels 2 through the usual king pin and spindle assembly. Frame 3 is mounted upon the axle in any conventional manner. A steering arm 4 connects one end of a tie rod 5 with the spindle of the left wheel. A second arm 6 connects the opposite end of the tie rod with the spindle of the other front wheel. The arm 6 is of U-shape, one leg of which is secured to the spindle and the other leg has an opening 7 therein to which a drag link is adapted to be connected.

The ends of the tie rod are bored out for a short distance and the interior surface of the bore is threaded. These end sections also have axial slots 8 cut therein, the purpose of which will be evident as the description proceeds. An eye bolt 9 is threaded into each end of the tie rod and when it is in the proper position a clamp 10 surrounding the outside of the rod is tightened by adjusting the nut and bolt 11, which tends to close the slot 8 and grip the eye bolt firmly. When in the proper position, the axis of the opening through the eye bolt is vertical.

The opening 12 through this eye has a circumferential notch 13 therein near the bottom within which is supported a circular plate 14 which has a central opening 15 surrounded by an upstanding flange 16 interiorly threaded. A grease or oil cup 17 screws into this opening and normally keeps it closed.

A circular metal shell 18 fits within the opening 12, the lower rim 19 thereof being offset outwardly to engage within the notch 13 to secure the shell within the opening. The portion of the shell extending above the eye is curved inwardly to form a parti-spherical surface 20 in the top of which is the circular opening 21.

A ball stud 22 whose head 23 is shaped to conform to the surface of the parti-spherical upper portion of the shell has the head located within the shell with its shaft projecting through the opening 21. In the outer face of the head is drilled a hole 24 for the reception of a cup 25 adapted to fit snugly therein. A compression spring 26 fits within the cup and bears against the outer end of the cup and the lower surface of the hole 24 tending to separate the two and forming a divided head. The base of the cup is spherical as shown at 27. Mounted upon the plate 14 in the base of the shell 18 is a metal disk 28 whose upper surface has a spherical depression 29 therein of the same shape as the base of the cup member and spaced from the plate 14 by the circular flange 30 integral with the disk. The disk has an opening 31 in the top rim for the passage of oil or grease.

In the assembled position, best shown in Figure 2, the disk is supported upon the plate 14 and carries the rounded end of the cup 25. The spring 26 pushes up on the stud head to keep the surface 23 thereof in contact with the shell 20 and down upon the cup 25 to consequently give a tight joint.

Above the head of the stud the body is tapered first outwardly as at 32 and then inwardly as at 33, the outer end 34 being threaded and having a cotter pin hole 35 diametrically through the end portion. The bight of the U-shaped arm 6 has a depending ear portion 36 through which is a tapered opening 37 adapted to fit upon the tapered portion 33 and is secured thereon by nut 38 and cotter pin 39. A dome-shaped metal washer 40 having a reverse bend in its inner periphery crimps and holds a similarly shaped piece of rubber 41 and fits around the tapered portion 32 to cover the opening 21 in the top of the shell and prevent dirt from getting in. A circular rubber disk 42 surrounds the bolt just above the metal washer, and contacts both the metal washer and the ear portion 36 to complete the dirt seal and keep the parts tightly together.

In operation the stud may rotate about the head, the sides 23 of the head sliding on the interior surface 20 of the shell and the lower outside surface of the cup sliding on the depression 29. The rubber member 41 is carried with the stud in its motion and overlaps the top 20 of the casing sufficiently to cover the opening 21 in all positions. Lubrication may be inserted through the cup 17 and pass up through the opening 31 to lubricate the moving parts. As these parts wear, the spring 26 will push the stud up and the cup down and at all times maintain a tight joint.

In Figure 4 is shown a modified form of our invention. The eye bolt 9 has a circular opening 43 therein which does not extend entirely through the eye and extends inwardly from the bottom. Within this opening is placed a circular member 44 of lubricant impregnated metal which has an interior parti-spherical surface therein to receive the head portion 45 of the stud 46. A tapered hole 55 is cut through the upper surface of the eye 9 and the member 44, through which the shaft of the bolt projects. As in the previous type, a hole 47 is bored in the face of the stud head to accommodate a cup 48 which carries a spring 49 therein, the lower surface of the cup being spherical as before. In the lower periphery of the opening 43 is cut a circumferential groove 50, in which the rim of a flange 51 on a second larger cup 52 is supported. Fitting snugly within this cup is a lubricant impregnated circular disk 53 which has a spherical impression 54 therein of the same shape and adapted to receive the spherical end of the cup member.

The upper portion of the stud shaft tapers outwardly from the head, has a flat circular surface 56 and then tapers inwardly as at 57 toward the threaded end 58. The ear portion 36 of the arm 6 fits upon the tapered portion 57, and is secured thereon by a nut 59. Adjacent the circular surface 56 is secured a dome-shaped metal washer 60 whose inner periphery is flanged and fits snugly to the stud, the outer surface curving down around the upper surface of the eye but being separated therefrom by a rubber washer 61 to form a dirt proof joint. A circular rubber washer 62 is also placed between the metal washer and the lower edge of the ear 36 to prevent noise and give a tight fit.

This type operates in exactly the same manner as the former, but it is not necessary to lubricate in this case, since the rubbing surfaces contain lubricant impregnated therein.

We claim:

1. In a tie rod joint, two levers, openings in the ends of both levers, a metal shell inserted in the opening in one lever having a parti-spherical top portion with an opening therethrough, a bolt having a head with a parti-spherical surface extending through the opening, said head engaging the interior surface of the shell, the shaft of the bolt passing through the opening in the second lever, an opening in the face of the bolt head, a hollow cup adapted to fit therein, a spring within the cup bearing on the cup bottom and the base of the opening in the head, and a base member to engage the end of the cup supported by an end plate secured in the opening in the first lever.

2. A steering gear linkage between two levers having openings in the ends comprising, a domed metal shell secured in one of the openings, a bolt extending through a hole in the dome and engaging the opening in the second lever, the head of the bolt being shaped to conform to the shape of the dome, and having an opening therein for slidably supporting a cup having a spherical base, a spring tending to push the cup from said opening, a bearing plate for the spherical end of the cup having a spherical depression therefor, and supported within the opening by an end plate.

3. In a tie rod joint having a rounded metal shell with an opening through the top and a bolt extending therethrough whose head conforms to the shape of the shell and having a hole in the face of the bolt head, a cup whose sides are slidably mounted in the hole, a spring within the cup and hole, the protruding base of the cup being rounded, a bearing plate for the rounded end having a matching rounded depression therein, and means to secure the plate in the shell whereby the spring tends to separate the cup and head to keep the domed surface of the shell and the bolt always in close contact.

4. In a tie rod joint, an opening through a lever having a spherical interior surface near one end, a bolt whose head has a matching spherical surface extending through the opening and whose shaft engages an opening through a second lever, and means to keep the bolt head always in contact with the spherical surface comprising a cup slidable within an opening in the face of the head, a spring within the cup tending to force it from the head and a bearing surface for the cup supported by the lever to keep the spring in compression whereby the spherical surface of the bolt head will always be in close contact with its matching surface in the lever opening.

5. In a tie rod joint of the ball and socket type between two levers, a bolt having a ball head, a matching spherical bearing surface in one lever, means to keep the bolt head in contact with the spherical bearing surface comprising a cup, slidably fitted within a hole in the face of the bolt head, an elastic member within the cup tending to force it from the head, and a bearing surface for the cup supported by the lever, the sides of the cup being of such height relative to the depth of the hole wherein it slides that the total movement of the bolt member axially within the joint can be predetermined and limited.

6. In a tie rod joint, a rounded shell having an opening through the top, a bolt extending therethrough whose head conforms to the shape of the shell and having a hole in the outer face of the bolt head, a cup slidable within the hole, a spring within the cup tending to force the latter from the head, a rounded base on the cup, a bearing plate fitting within the shell and having a matched rounded depression for the cup end whereby the spring tends to keep the cup and head tightly against their bearing surfaces and means for introducing lubricant into the space adjacent the cup including an opening in said plate.

WALTER A. KULL.
OLAF RASMUSSEN.